(No Model.)
C. W. GLIDDEN.
ROTARY CUTTER.
No. 388,552. Patented Aug. 28, 1888.
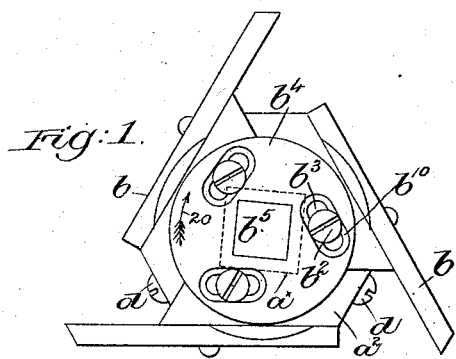
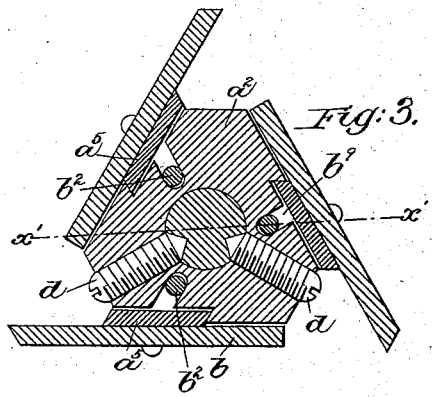
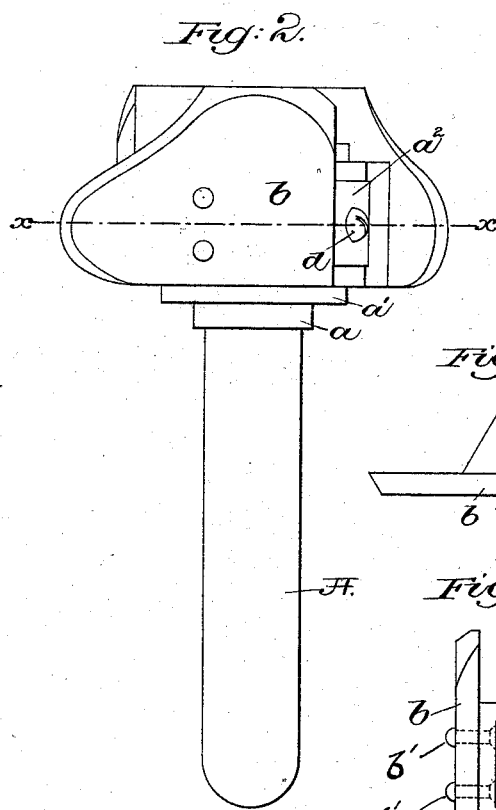
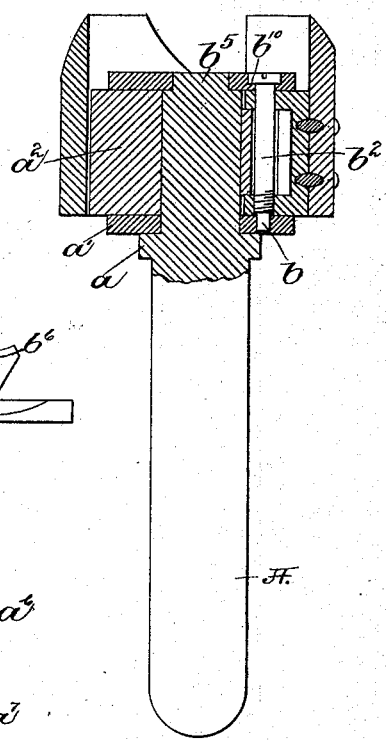
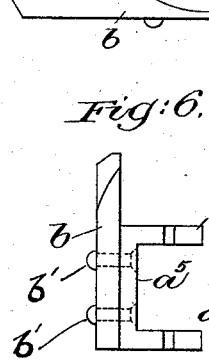
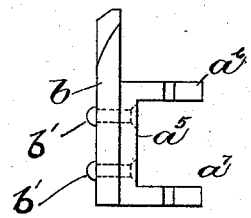
Witnesses.
Fred L. Emery
John F. C. Prinkett
Inventor.
Charles W. Glidden.
by Crosby & Gregory
Attys

UNITED STATES PATENT OFFICE.

CHARLES W. GLIDDEN, OF LYNN, ASSIGNOR TO JAMES W. BROOKS, TRUSTEE, OF CAMBRIDGE, MASSACHUSETTS.

ROTARY CUTTER.

SPECIFICATION forming part of Letters Patent No. 388,552, dated August 28, 1888.

Application filed October 21, 1887. Serial No. 252,993. (No model.)

*To all whom it may concern:*

Be it known that I, CHARLES W. GLIDDEN, of Lynn, county of Essex and State of Massachusetts, have invented an Improvement in Rotary Cutters for Heel-Trimming, &c., of which the following description, in connection with the accompanying drawings, is a specification, like letters on the drawings representing like parts.

This invention relates to rotary cutters especially adapted, among other things, to be used on machines for trimming heels of boots and shoes, it having for its object to provide a rotary cutter in which the knives when worn may be automatically and simultaneously adjusted to place them in position to be ground, the adjustment of the said knives being so controlled as to insure a minimum amount of grinding or sharpening to leave the tips or cutting ends of the knives equidistant from a common center which in practice will be the center of the arbor upon which the cutter is mounted.

My invention therefore consists, essentially, in a rotary cutter consisting, essentially, of a head, two or more blades thereon, and means to simultaneously and automatically adjust the blades with relation to the head.

Other features of my invention will be pointed out in the claims at the end of this specification.

Figure 1 is a top view of a rotary cutter, showing one practical embodiment of my invention; Fig. 2, an elevation of Fig. 1; Fig. 3, a section of Fig. 2 on the line $x\ x$; Fig. 4, a section of Fig. 3 on the line $x'\ x'$; and Figs. 5 and 6 details, to be referred to.

Referring to Fig. 2, A may represent the shaft or arbor of a heel-trimming machine of any desired or well-known construction. The shaft A, as herein shown, has a collar, $a$, against which bears a disk, $a'$, fixed, as shown, preferably on a square or other than round collar. (See dotted lines, Fig. 1.) The said shaft also has loosely mounted upon it a block, $a^2$, constituting the head of my improved rotary cutter. The cutter-head $a^2$ is herein shown as hexagonal in shape, and is cut radially, as herein shown, at three of its sides to form guideways for a series of knife-carriers, herein shown as angle-irons, comprising a back piece, $a^5$, and arms $a^6\ a^7$, (see Fig. 6,) the said arms sliding in the said guideways. The arms $a^6\ a^7$ project obliquely from each back piece, $a^5$, so that when applied to the cutter-head the knife $b$, herein shown as secured to the back piece, $a^5$, by screws $b'$, will be substantially parallel to the side of the cutter-head. Each knife-carrier is secured to the cutter-head by a screw, $b^2$, inserted through a slot, $b^3$, in a disk, $b^4$, fixed upon the preferably square or other than round end or head $b^5$ of the shaft A, the said screw being extended through a hole, $b^6$, in each arm $a^6\ a^7$ of the knife-carrier, and into a slot in the disk $a'$, which registers with the slot $b^3$ in the disk $b^4$, the said screw passing through a slot, $b^9$, in the cutter-head. The hole $b^6$ in the arm $a^7$ of the knife-carrier is screw-threaded to engage threads on the lower end of the screw $b^2$ to unite the knife-carrier and disk to the cutter-head. The slot $b^3$ in the disk $b^4$ is provided with a flange or shoulder, $b^{10}$, upon which the head of the screw $b^2$ rests when the knife-carrier is fastened to or made as one piece with the disks $a'\ b^4$. The slots $b^3$ in the disk $b^4$ and the slot registering therewith in the disk $a'$ are made eccentric to the center of the said disks, so that when the shaft A is turned the said eccentric slots act as cam-slots upon the screws $b^2$ and move the knife-carrier and knife radially, or from the center of the cutter-head, according to the direction of movement of the said shaft.

The cutter-head may be made fast upon the shaft, as herein shown, by means of the set-screws $d$.

In operation the knife-carriers are made fast to the cutter-head and the latter to the shaft A, and the tool is ready for use. After considerable use the knives become dull and require sharpening, which may be done in any suitable manner. To sharpen the knives, the screws $b^2$ and $d$ are loosened so that the shaft A may be turned independently of the cutter-head, or vice versa. When the shaft A is moved so as to rotate the disk $b^4$ in the direction of arrow 20, Fig. 1, the slots $b^3$ act on the screws $b^2$ and force the knife-carrier and knife outward or radially from the shaft. When the knife has been moved outward the desired distance, the screws $b^2$ $d$ are tightened, and the knives ground or otherwise sharpened. The adjustment of the knives is such that a minimum amount of metal is wasted by sharpening.

I am not aware that prior to my invention a rotary cutter has been provided with two or more knives automatically adjusted simultaneously, and therefore I do not desire to limit myself to the specific means herein described for so adjusting the said knives simultaneously, but desire to embrace within the scope of my invention any equivalent means for automatically adjusting the knives simultaneously.

I claim—

1. A rotary cutter consisting, essentially, of a head and two or more blades thereon, combined with means, substantially as described, to simultaneously and automatically adjust the blades with relation to the head, and with means to confine the blades in an adjusted position, for the purpose set forth.

2. The herein-described rotary cutter, it consisting, essentially, of a cutter-head having a radial guideway, and a knife-carrier fitted therein, combined with a disk having a slot eccentric to the center of the said disk, and with means for adjustment secured to the knife-carrier and adapted to be acted upon by the said slot, substantially as described.

3. The combination, with a shaft, of a rotary cutter adapted to be secured thereto, the said cutter comprising a cutter-head having radial guideways, a knife carrier fitted therein, a disk, $b^4$, provided with slots arranged eccentric to the center of the said disk, and screws to unite said knife-carrier and disk, substantially as described.

4. In a rotary cutter, a cutter-head having radial guideways and a knife-carrier fitted in each guideway, combined with a disk, $b^4$, having cam-slots $b^3$, and a screw inserted through each slot and adapted to be acted upon by it to move the knife-carrier, substantially as described.

5. The combination, in a rotary cutter, of a tangentially-adjustable knife-carrier with an actuating disk or plate therefor to adjust the said knife-carrier, substantially as described.

6. The combination, with a shaft, of a rotary cutter comprising a cutter-head, $a^2$, radially-adjustable knife-carriers carried thereby, the disk $b^4$, provided with cam-slots $b^3$, and disk $a'$, having like slots to register with the cam-slots $b^3$, and screws $b^2$, substantially as described.

In testimony whereof I have signed my name to this specification in the presence of two subscribing witnesses.

CHARLES W. GLIDDEN.

Witnesses:
BERNICE J. NOYES,
F. L. EMERY.